(12) United States Patent
Citron

(10) Patent No.: US 8,633,287 B2
(45) Date of Patent: Jan. 21, 2014

(54) OLEFIN POLYMERIZATION PROCESS

(75) Inventor: Joel David Citron, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/390,697

(22) PCT Filed: Aug. 17, 2010

(86) PCT No.: PCT/US2010/045728
§ 371 (c)(1),
(2), (4) Date: Apr. 23, 2012

(87) PCT Pub. No.: WO2011/022373
PCT Pub. Date: Feb. 24, 2011

(65) Prior Publication Data
US 2012/0271014 A1   Oct. 25, 2012

Related U.S. Application Data

(60) Provisional application No. 61/234,355, filed on Aug. 17, 2009, provisional application No. 61/334,251, filed on May 13, 2010, provisional application No. 61/362,579, filed on Jul. 8, 2010.

(51) Int. Cl.
| | | |
|---|---|---|
| C08F 210/02 | (2006.01) | |
| C08F 4/606 | (2006.01) | |
| C08F 4/613 | (2006.01) | |

(52) U.S. Cl.
USPC ........... 526/113; 526/114; 526/160; 526/161; 526/165; 526/348; 526/943; 585/523; 525/242

(58) Field of Classification Search
USPC ......... 526/113, 114, 160, 161, 165, 348, 943; 502/113, 152, 167; 585/523
See application file for complete search history.

(56) References Cited

U.S. PATENT DOCUMENTS

| | | |
|---|---|---|
| 5,071,927 A | 12/1991 | Benham et al. |
| 5,137,994 A | 8/1992 | Goode et al. |
| 5,586,541 A | 12/1996 | Tsai |
| 5,686,542 A | 11/1997 | Ostoja-Starzewski et al. |
| 5,753,785 A | 5/1998 | Reddy et al. |
| 5,856,610 A | 1/1999 | Tamura et al. |
| 2005/0192470 A1* | 9/2005 | Patil et al. ...................... 585/521 |
| 2008/0058485 A1* | 3/2008 | Wang et al. ................... 526/147 |

OTHER PUBLICATIONS

C. Denger, et al., Makromol. Chem. Rapid Commun., vol. 12, p. 697-701 (1991).
D.M. Simpson & G.A. Vaughan, "Ethylene polymers, LLDPE" Encyclopedia of Polymer Science and Technology, vol. 2, John Wiley & Sons, New York, (online) 2005), p. 441-482.
E. A. Benham, et al., Polymer Engineering and Science, vol. 28, p. 1469-1472 (1988).
J. Wasilke, et al., Concurrent Tandem Catalysis, Chem Rev, 2005, No. 105, p. 1001-1020.
W. Kaminsky, et al., Transition Metals and Organometallics as Catalysts for Olefin Polymerization, Springer-Verlag, 1987, p. 347-360.

\* cited by examiner

*Primary Examiner* — Caixia Lu

(57) ABSTRACT

A polymerization process for copolymerizing ethylene and a series of α-olefins to form a branched polyethylene, in which the series of α-olefins is generated in-situ by an ethylene oligomerization catalyst, is improved if the oligomerization catalyst has a Schulz-Flory constant of about 0.30 to about 0.55. This makes very little higher molecular weight α-olefins, which allows for easy removal of unpolymerized α-olefins from the polyolefin product.

13 Claims, No Drawings

OLEFIN POLYMERIZATION PROCESS

FIELD OF THE INVENTION

A polymerization to form a branched polyethylene in which an ethylene copolymerization catalyst and an ethylene oligomerization catalyst that forms a series of ethylene oligomers that are α-olefins, is improved if the oligomerization catalyst has a Schulz-Flory constant in a specified range.

BACKGROUND OF THE INVENTION

Polymerization of olefins, especially ethylene, to form polyolefins is an important commercial process, literally millions of tons of such polymers being produced annually. Among the useful grades of polyethylene is a branched polyethylene formed by copolymerizing ethylene with one or more α-olefins. The resulting polyolefin is sometimes referred to as Linear Low Density Polyethylene (LLDPE), see for instance D. M. Simpson & G. A. Vaughan, "*Ethylene polymers, LLDPE*" *Encyclopedia of Polymer Science and Technology*, Vol. 2, John Wiley & Sons, New York, (online) 2005), p. 441-482, which is hereby included by reference, LLDPEs are typically made by adding to the polymerization process ethylene and one or more preformed α-olefins, and contacting them with a catalyst system that is capable of copolymerizing these olefins.

However α-olefins are more expensive than ethylene itself and so raise the cost of the resulting copolymer. Processes have been developed in which along with the copolymerization catalyst, a catalyst that can oligomerize ethylene to α-olefins is also added, thereby obviating the need for separately added α-olefins, see for instance U.S. Pat. No. 6,297,338, which is hereby included by reference. However, in many instances these oligomerization catalysts produce a series of α-olefins, e.g. 1-butene, 1-hexene, 1-octene, 1-decene, 1-dodecene, etc. The α-olefins thus produced may not be completely polymerized, and higher molecular weight olefins produced are difficult to remove from the resulting polyolefin since these higher molecular weight olefins are not very volatile. This problem has been addressed in U.S. Pat. No. 6,586,541, which is hereby included by reference. However, the process described in this patent requires at least one additional reactor space and also will produce at least small amounts of polyolefin that are different than the majority of the product. Both of these effects are undesirable. Therefore improved methods of reducing residual α-olefins in such a process are desired.

Other references that report simultaneous oligomerization and polymerization of various olefins are World Patent Application 90/15085, U.S. Pat. Nos. 5,753,785, 5,856,610, 5,686,542, 5,137,994, and 5,071,927, C. Denger, et al., Makromol. Chem. Rapid Commun., vol. 12, p. 697-701 (1991), and E. A. Benham, et al., Polymer Engineering and Science, vol. 28, p. 1469-1472 (1988).

SUMMARY OF THE INVENTION

This invention concerns a process for the manufacture of a branched polyethylene, comprising, contacting ethylene with a copolymerization catalyst and an oligomerization catalyst that produces a series of α-olefins, wherein the improvement comprises, said oligomerization catalyst that produces said series of α-olefins having a Schulz-Flory constant of from about 0.30 to about 0.55 under process conditions.

Other features and advantages of the present invention will be better understood by reference to the detailed description that follows.

DETAILED DESCRIPTION OF THE INVENTION

In this description certain terms are used, and some of them are defined below.

By "hydrocarbyl group" is meant a univalent group containing only carbon and hydrogen. As examples of hydrocarbyls may be mentioned unsubstituted alkyls, cycloalkyls, and aryls. If not otherwise stated, it is preferred that hydrocarbyl groups (and alkyl groups) herein contain from 1 to about 30 carbon atoms.

By "substituted hydrocarbyl" is meant a hydrocarbyl group that contains one or more substituent groups that are inert under the process conditions to which the compound containing these groups is subjected (e.g., an inert functional group, see below). The substituent groups also do not substantially detrimentally interfere with the polymerization process or the operation of the polymerization catalyst system. If not otherwise stated, it is preferred that (substituted) hydrocarbyl groups herein contain from 1 to about 30 carbon atoms. Included in the meaning of "substituted" are rings containing one or more heteroatoms, such as nitrogen, oxygen, and/or sulfur, and wherein the free valence of the substituted hydrocarbyl may be to the heteroatom. In a substituted hydrocarbyl, all of the hydrogens may be substituted, as in trifluoromethyl.

By "(inert) functional group" is meant a group, other than hydrocarbyl or substituted hydrocarbyl, that is inert under the process conditions to which the compound containing the group is subjected. The functional groups also do not substantially deleteriously interfere with any process described herein where the compound in which they are present takes part. Examples of functional groups include halo (fluoro, chloro, bromo, and iodo), and ether such as $-R^{50}$ wherein $R^{50}$ is hydrocarbyl or substituted hydrocarbyl. In cases in which the functional group may be near a transition metal atom, the functional group alone should not coordinate to the metal atom more strongly than the groups in those compounds that are shown as coordinating to the metal atom, that is, they should not displace the desired coordinating group.

By a "cocatalys" or a "catalyst activator" is meant one or more compounds that react with a transition metal compound to form an activated catalyst species. One such catalyst activator is an "alkylaluminum compound," which herein means a compound in which at least one alkyl group is bound to an aluminum atom. Other groups such as, for example, alkoxide, hydride, an oxygen atom bridging two aluminum atoms, and halogen may also be bound to aluminum atoms in the compound.

By an "α-olefin" is meant a composition predominantly comprising a compound or mixture of compounds of the formula $H(CH_2CH_2)qCH=CH_2$ wherein q is an integer of from 1 to about 18. In most cases, the α-olefin product of the present process will predominantly be a mixture of compounds having differing q values of from 1 to 10, with a minor amount of compounds having q values of more than 10. Preferably less than 5 weight percent, and more preferably less than 2 weight percent, of the product will have q values over 10. The product may further contain small amounts (preferably less than 30 weight percent, more preferably less than 10 weight percent, and especially preferably less than 2 weight percent) of other types of compounds such as alkanes, branched alkenes, dienes, and/or internal olefins.

By a "series" of α-olefins is meant compounds having the formula $H(CH_2CH_2)qC_H=CH_2$ wherein at least three compounds having different q values are produced. Preferably at least three of these values are 1, 2, and 3.

By "aryl" is meant a monovalent aromatic group in which the free valence is to the carbon atom of an aromatic ring. An aryl may have one or more aromatic rings, which may be fused, connected by single bonds or other groups.

By "substituted aryl" is meant a monovalent substituted aromatic group that contains one or more substituent groups that are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that (substituted) aryl groups herein contain from 1 to about 30 carbon atoms. Included in the meaning of "substituted" are rings containing one or more heteroatoms, such as nitrogen, oxygen, and/or sulfur, and wherein the free valence of the substituted hydrocarbyl may be to the heteroatom. In a substituted aryl all of the hydrogens may be substituted, as in trifluoromethyl. These substituents include (inert) functional groups. Similar to an aryl, a substituted aryl may have one or more aromatic rings, which rings may be fused or connected by single bonds or connected to other groups; however, when the substituted aryl has a heteroaromatic ring, the free valence in the substituted aryl group can be to a heteroatom (such as nitrogen) of the heteroaromatic ring instead of a carbon.

By "process conditions" is meant conditions for causing branched polyethylene with the types of catalysts described herein. Such conditions may include temperature, pressure, and/or oligomerization method(s) such as liquid phase, continuous, batch, and the like. Also included may be cocatalysts that are needed and/or desirable.

The "Schulz-Flory constant" of the mixtures of α-olefins produced is a measure of the molecular weights of the olefins obtained, usually denoted as factor K, from the Schulz-Flory theory (see for instance B. Elvers, et al., Ed. Ullmann's Encyclopedia of Industrial Chemistry, Vol. A13, VCH Verlagsgesellschaft mbH, Weinheim, 1989, p. 243-247 and 275-276). This is defined as:

$$K = n(C_{n+2} \text{ olefin})/n(C_n \text{ olefin})$$

wherein $n(C_n$ olefin) is the number of moles of olefin containing n carbon atoms, and $n(C_{n+2}$ olefin) is the number of moles of olefin containing n+2 carbon atoms, or in other words the next higher oligomer of $C_n$ olefin. From this can be determined the weight (mass) and/or mole fractions of the various olefins in the resulting oligomeric reaction product mixture.

By a "copolymerization catalyst" is meant a catalyst that can readily, under the process conditions, copolymerize ethylene and α-olefins of the formula $H(CH_2CH_2)qC_H = CH_2$ wherein q is an integer of from 1 to about 15.

Many types of catalysts are useful as the copolymerization catalyst. For instance, so-called Ziegler-Natta and/or chromium and/or metallocene-type catalysts may be used. These types of catalysts are well known in the polyolefin field, see for instance *Angew. Chem., Int. Ed. Engl.*, vol. 34, p. 1143-1170 (1995), EP-A-0416815 and U.S. Pat. No. 5,198,401 for information about metallocene-type catalysts; and J. Boor Jr., *Ziegler-Natta Catalysts and Polymerizations*, Academic Press, New York, 1979 for information about Ziegler-Natta type catalysts, all of which are hereby included by reference. Chromium catalysts are also well known, see for instance E. Benham, at al., *Ethylene Polymers, HDPE* in *Encyclopedia of Polymer Science and Technology* (online), John Wiley & Sons, and D. M. Simpson, at al., *Ethylene Polymers, LLDPE*, in *Encyclopedia of Polymer Science and Technology* (online), John Wiley & Sons, both of which are hereby included by reference. Many of the useful polymerization conditions for these types of catalysts and the oligomerization catalyst coincide, so conditions for the process are easily accessible. Oftentimes a "cocatalyst" or "activator" is needed for metallocene or Ziegler-Natta type polymerizations, which cocatalyst is oftentimes the same as is sometimes needed for the oligomerization catalyst. In many instances cocatalysts or other compounds, such as an alkylaluminum compound, may be used with both types of catalysts.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well known constrained geometry catalysts, as described in EP-A-0416815, EP-A-0420436, EP-A-0671404, EP-A-0643066 W091104257. Also the class of transition metal complexes described in, for example, W098130609, U.S. Pat. Nos. 5,880,241, 5,955,555, 6,060,569, and 5,714,556 can be used. All of the aforementioned publications are incorporated by reference herein.

The catalyst for the copolymerization of the ethylene and the α-olefin series should preferably be a catalyst that can copolymerize ethylene and α-olefins so that the relative rate of copolymerization of these two types of monomers are very roughly equal. Metallocene-type catalysts are most preferred, and preferred metallocene catalysts are those listed in previously incorporated World Patent Application 1999/150318, which is hereby included by reference.

It is to be understood that "oligomerization catalyst" and "copolymerization catalyst" also include other compounds such as cocatalysts and/or other compounds normally used with the oligomerization catalyst and/or copolymerization catalyst to render that particular catalyst active for the polymerization or oligomerization it is meant to carry out.

A preferred oligomerization catalyst is an iron complex of a ligand of the formula:

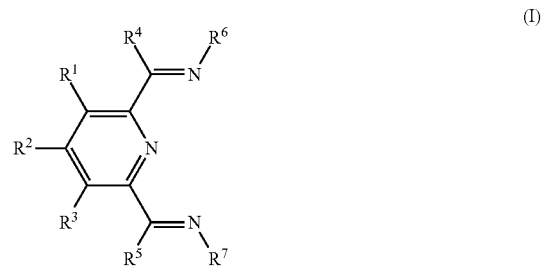

(I)

wherein: $R^1$, $R^2$, and $R^3$ are each independently hydrogen, hydrocarbyl, substituted hydrocarbyl or an inert functional group, provided that any two of $R^1$, $R^2$, and $R^3$ vicinal to one another, taken together may form a ring; $R^4$, and $R^5$ are each independently hydrogen, hydrocarbyl, substituted hydrocarbyl or an inert functional group, provided that $R^1$ and $R^4$ and/or $R^3$ and $R^5$ taken together may form a ring; and $R^6$ and $R^7$ are each independently aryl or substituted aryl.

In an iron complex of (I), (I) is usually thought of as a tridentate ligand coordinated to the iron atom through the two imino nitrogen atoms and the nitrogen atom of pyridine ring. It is generally thought that the more sterically crowded it is about the iron atom, the higher the molecular weight of the polymerized olefin (ethylene). In order to make α-olefins, and especially to make them in a process having a relatively low Schulz-Flory constant (such as 0.35-0.55), very little steric crowding about the iron atom is desired.

Such compounds of (I) are readily available. For instance in WO2005/092821 it is demonstrated that the iron complex, in which $R^4$ and $R^5$ are both hydrogen and $R^6$ and $R^7$ are both phenyl, has a Schulz-Flory constant of about 0.29 (this reference states the Schulz-Flory constant is about 0.4, but this is apparently based incorrectly on the weight fraction of the olefins produced, not correctly the mole fraction). In G. J. P. Britovsek et al., *Chem. Eur. J.*, vol. 6 (No. 12), p. 2221-2231 (2000), which is hereby included by reference, a ligand, in which $R^4$ and $R^5$ are both hydrogen and $R^6$ and $R^7$ are both 2-methylphenyl, gives an oligomerization at 50° C. in which the Schulz-Flory constant is reported to be 0.50. Other combinations of groups would give ligands with useful Schulz-Flory constants. For instance, $R^4$ and $R^5$ may both be methyl or hydrogen (or one could be methyl and one could be hydrogen) and $R^6$ could be phenyl, while $R^7$ could be 2-fluorophenyl or 2-methylphenyl or 2-chlorophenyl; or $R^6$ and $R^7$ could both be 2-fluorophenyl; or $R^6$ and $R^7$ could both be 4-isopropylphenyl; or both $R^6$ and $R^7$ could both be 4-methylphenyl. In one particularly useful compound $R^1$, $R^2$, and $R^3$ are hydrogen, $R^4$ and $R^5$ are both methyl, and $R^6$ and $R^7$ are independently both phenyl not substituted in the ortho positions. For example $R^6$ and $R^7$ may be phenyl, 4-substituted phenyl such as 4-methylphenyl, or phenyl substituted in the 3 and/or 4 and/or 5 positions such as 3,4,5,-trimethylphenyl. More preferably $R^6$ and $R^7$ are both either phenyl or 4-alkylphenyl, "alkyl" here meaning an alkyl group having 1 to 12 carbon atoms. In another especially preferred iron complex of (I), $R^1$, $R^2$, and $R^3$ are hydrogen, $R^6$ is

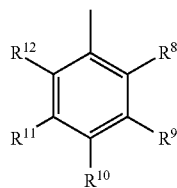

and $R^7$ is

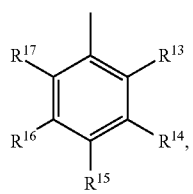

wherein two of $R^4$, $R^5$, $R^8$, $R^{12}$, $R^{13}$, and $R^{17}$ are independently methyl or ethyl and the remainder of $R^4$, $R^5$, $R^8$, $R^{12}$, $R^{13}$, and $R^{17}$ are hydrogen, and $R^9$, $R^{10}$, $R^{11}$, $R^{14}$, $R^{15}$, and $R^{16}$ are each independently hydrogen, a functional group, hydrocarbyl, or substituted hydrocarbyl. Other variations in which just small increments of steric hindrance are added or subtracted about the iron atom are obvious to those skilled in the art. It is also believed that in addition to these steric effects that electron withdrawing groups on $R^6$ and/or $R^7$ tend to lower the Schulz-Flory constant.

The synthesis of the ligands (I) and their iron complexes are well known, see for instance U.S. Pat. No. 6,103,946, G. J. P. Britovsek, et al., cited above, and World Patent Application WO2005/092821.

Other relatively small aryl groups may also be used, such as 1-pyrrolyl, made from substituted or unsubstituted 1-aminopyrrole (see for instance World Patent Application 2006/0178490, which is hereby included by reference). Analogous substitution patterns to those carried out in phenyl rings may also be used to attain the desired degree of steric hindrance, and hence the desired Schulz-Flory constant. Aryl groups containing 5-membered rings such as 1-pyrrolyl may especially useful for obtaining low Schulz-Flory constants, since they are generally less sterically crowding than 6-membered rings. Preferred aryl groups for $R^6$ and $R^7$ are phenyl and substituted phenyl.

While steric hindrance about the iron atom is usually the dominant item controlling the Schulz-Flory constant, process conditions may have a contributing effect. Higher process temperatures generally give lower Schulz-Flory constants, while higher ethylene pressures (concentrations) generally give a higher Schulz-Flory constant, all other conditions being equal. In order to measure the Schulz-Flory constant of the oligomerization during the manufacture of the branched polyethylene the process is carried out using the same conditions as the process to produce the branched polyethylene, but the copolymerization catalyst is omitted and any cocatalysts are scaled back in relationship to the total amount of oligomerization catalyst present compared to the total of the copolymerization catalyst and oligomerization catalyst usually used. However it is to be noted that somewhat more than normal cocatalyst, such as an alkylaluminum compound, may have to be used to remove traces of any process poisons present, such as water. The resulting mixture of α-olefins is analyzed to determine their molecular ratios. This is most conveniently done by standard gas chromatography using appropriate standards for calibration. Preferably the ratios (as defined by the equation for "K," above) between olefins from $C_4$ to $C_{12}$ are each measured and then averaged to obtain the Schulz-Flory constant. If the ratios of higher olefins, such as $C_{12}/C_{10}$ are too small to measure accurately, they may be omitted from the calculation of the constant.

Under a given set of process conditions, generally the higher the molar ratio of oligomerization catalyst to copolymerization catalyst, the higher the branching level in the branched polyethylene produced. This is true simply because an increase in the relative concentration of oligomerization catalyst present increases the amount of α-olefins that will be produced for a given amount of polymerization, and so the concentration of α-olefins produced by the process will be higher, particularly under equilibrium conditions in a continuous process.

The choice of the desired Schulz-Flory constant is somewhat complex. It is believed that the ethyl branches (from 1-butene) are not as good at improving polymer properties as are longer branches (as from 1-hexene and 1-octene), so from this point of view a higher Schulz-Flory constant would be desirable, see D. M. Simpsons and G. A. Vaughan, cited above. However, higher Schulz-Flory constants also give larger amounts of higher olefins, which may be more difficult to remove from the product polyolefin if they are not completely copolymerized. So the choice of the desired Schulz-Flory constant will principally depend on a balance of these two parameters, desired product properties vs. the ability to remove unpolymerized higher α-olefins. The differences in production of various olefins with different Schulz-Flory constants are illustrated in Table 1.

TABLE 1*

| | | SF Constant | | | | | |
|---|---|---|---|---|---|---|---|
| | | 0.65 | | 0.55 | | 0.45 | | 0.35 | |
| Olefin Carbons | Mole % | Wt % | Mole % | Wt % | Mole % | Wt % | Mole % | wt % |
| 4 | 36.2 | 20.9 | 50.2 | 34.9 | 55.1 | 40.3 | 65.0 | 52.4 |
| 6 | 23.5 | 19.6 | 25.1 | 25.2 | 24.8 | 26.3 | 22.8 | 26.6 |
| 8 | 15.3 | 17.1 | 12.5 | 16.8 | 11.2 | 15.8 | 8.0 | 12.5 |
| 10 | 9.9 | 12.8 | 6.3 | 9.8 | 5.0 | 8.0 | 2.8 | 5.1 |
| 12 | 6.5 | 10.9 | 3.1 | 6.2 | 2.3 | 4.9 | 1.0 | 2.3 |
| 14 | 4.2 | 8.2 | 1.6 | 3.8 | 1.0 | 2.5 | 0.3 | 0.8 |
| 16 | 2.7 | 6.0 | 0.8 | 2..1 | 0.5 | 1.4 | 0.1 | 0.3 |
| 18 | 1.8 | 4.5 | 0.4 | 1.2 | 0.2 | 0.6 | 0.0 | 0.0 |

*Especially for higher SF (Schulz-Flory) Constants actual values may be slightly higher since olefins larger than $C_{18}$ not included in calculations.

The Schulz-Flory constant should be from about 0.30 to about 0.55. A preferred minimum constant is about 0.35, more preferably about 0.40. A preferred maximum constant is about 0.50, more preferably about 0.45. It is to be understood that a preferred Schulz-Flory constant range may be designated by choosing any minimum and any maximum constants described herein. One preferred Schulz-Flory constant range is from about 0.35 to about 0.50.

Since the process conditions useful for many of the various copolymerizations and oligomerization catalysts overlap, process conditions will usually be in this area of overlap, see for instance U.S. Pat. Nos. 6,297,338, 6,620,895, and 6,555,631. Useful process conditions for complexes of (I) are found in U.S. Pat. No. 6,103,946, and G. J. P. Britovsek, et al., cited above, all of which are hereby included by reference. Useful process conditions for copolymerization catalysts such as metallocene catalysts and Ziegler-Natty catalysts are well known in the art.

In typical commercial processes for making LLDPE the catalyst is often supported on a particulate material (a "support"). Typical supports are silica, alumina, day, and inorganic salts, such as $MgCl_2$. One or both, preferably both, of the copolymerization catalyst and the oligomerization catalyst may be supported on a support. They may supported separately on the same or two different supports, or both may be supported on the same support particles. Supportation of polymerization/oligomerization catalysts for olefins is well known in the art, and described in many of the above cited references.

Besides the oligomerization and copolymerization catalysts being present, other types of catalysts may be present. For instance a catalyst that readily homopolymerizes ethylene but does not readily copolymerize α-olefins may be present so that the polymeric product is a blend of a branched polyethylene and an essentially unbranched polyethylene. Such a process is described in U.S. Pat. No. 6,555,631, which is hereby to included by reference. By a catalyst that homopolymerizes ethylene but does not readily copolymerize ethylene and α-olefins is meant a catalyst that under process conditions copolymerizes 10 mole percent or less, more preferably 5 mole percent or less, of the amount of α-olefins copolymerized by the copolymerization catalyst present. This may be readily determined by running the process with just the copolymerization catalyst or the catalyst that does not copolymerize α-olefins readily, each in the presence of the oligomerization catalyst and comparing the branching levels of the polyethylenes produced. Another catalyst that may be present is another copolymerization catalyst, that may, for instance, give a different molecular weight branched polyethylene as a product. Thus, a product containing branched polyethylene with a broad molecular weight distribution may be obtained. Other combinations will be evident to the artisan.

The branched polyethylene produced by the present process usually has branches of the formula —$CH_2CH_2(CH_2CH_2)_qH$ wherein q, and its preferred values, are defined, as set forth above. These polyolefins are described in U.S. Pat. No. 6,297,338. The branching levels, defined as the number of methyl groups per 1,000 methylene groups in the polyolefin, may range from about 0.5 to about 150. Branching levels may be readily measured by NMR spectroscopy, see for instance World Patent Application 1996/023010. The densities of these branched polyolefins may range from about 0.85 to about 0.96 g/cc., depending on the branching level. The polymers may range from elastomers, to plastomers, to LLDPE, medium density polyethylene, to essentially high density polyethylene, these being ordered from high to low branching levels. The polymers may be made by any process in which it is useful to make a branched polyethylene by copolymerizing ethylene with one or more α-olefins of the formula H(CH2)sCH═CH2, wherein s is an integer of from 1 to 30. Thus useful processes include gas phase and liquid phase, including slurry and solution processes. Which process is useful for any particular type of product is determined in part by the properties of the product. For example, elastomer and plastomers, with densities below about 0.90, are often made in solution processes, while polymers that have higher melting points are often made in gas phase or slurry processes. Continuous processes are preferred, although batch or semibatch processes can also be used. All of these processes are well known in the art, for instance for LLDPE see D. M. Simpson & G. A. Vaughan, "*Ethylene polymers, LLDPE*" Encyclopedia of Polymer Science and Technology, Vol. 2, John Wiley & Sons, New York, (online) 2005), p. 441-482. Gas phase processes often utilize fluidized bed reactors wherein the catalysts are supported. Solution and slurry (suspension) polymerizations of these types are well known, see for instance Y. V. Kissin, *Polyethylene, Linear Low Density*, Kirk-Othmer Encyclopedia of Chemical Technology (online), John Wiley & Sons, DOI 10.1002/0471238961.10209149511091919.a01.pub2 (2005), which is hereby included by reference for the polymerization. Useful types of reactors for slurry and solution processes include continuous stirred tank reactors and loop reactors. In slurry and solution processes the catalyst(s) may be supported or not, although in solution processes they are usually not supported.

An important part of the process in this instance, and in processes in which α-olefins such as 1-hexene and/or 1-octene, for instance, are used, is the removal of unpolymerized olefins from the polymeric product. Since very little higher olefins, which are not very volatile, are produced in the present process, methods used to remove olefins such as 1-hexene and 1-octene are applicable to the present process. In gas phase processes, these olefins may be removed in the resin degassing step. For solution processes, they may be removed in the extruder, which removes solvent. In slurry processes they may be removed in the flasher and dryer. In addition, final "traces" of these olefins may be removed in any of these processes in the extruder, which usually feeds a pelletizer at the end of the production line by adding vacuum ports to that extruder.

After the unpolymerized α-olefins are removed from the polymer stream the olefins may be purified and recycled back into the polymerization and/or used in other processes and/or sold. For recycle, the recovered α-olefins may be separated into "pure" compounds or returned to the polymerization as a mixture of α-olefins.

The polyolefins produced by this process are useful (depending on their branching level) as molding resins for containers, mechanical parts, and other uses, packaging films, electrical insulation, adhesives, elastomers, rigid, or flexible foams, etc.

Although this invention has been described in connection with specific forms thereof, it should be appreciated that a wide array of equivalents may be substituted for the specific elements shown and described herein without departing from the spirit and scope of this invention as described in the appended claims.

What is claimed is:

1. A process for the manufacture of a branched polyethylene, comprising, contacting ethylene with a copolymerization catalyst and an oligomerization catalyst that produces a series of α-olefins, wherein the improvement comprises, said oligomerization catalyst that produces said series of α-olefin having a Schulz-Flory constant of from about 0.30 to about 0.55 under process conditions.

2. The process as recited in claim 1 wherein said Schulz-Flory constant is from about 0.35 to about 0.50.

3. The process as recited in claim 1 wherein said copolymerization catalyst is a metallocene, a chromium, or a Ziegler-Natta catalyst.

4. The process as recited in claim 1 wherein said oligomerization catalyst is an iron complex of a ligand of the formula:

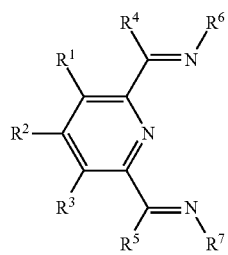

(I)

wherein:
R$^1$, R$^2$, and R$^3$ are each independently hydrogen, hydrocarbyl, substituted hydrocarbyl or an inert functional group, provided that any two of R$^1$, R$^2$, and R$^3$ vicinal to one another taken together may form a ring;
R$^4$ and R$^5$ are each independently hydrogen, hydrocarbyl, substituted hydrocarbyl, or an inert functional group provided that R$^1$ and R$^4$ and/or R$^3$ and R$^5$ taken together may form a ring; and
R$^6$ and R$^7$ are each independently aryl or substituted aryl.

5. The process as recited in claim 4 wherein R$^4$ and R$^5$ are both methyl or hydrogen, or one of R$^4$ and R$^5$ is methyl and the other is hydrogen.

6. The process as recited in claim 4 wherein R$^6$ and R$^7$ are phenyl or substituted phenyl.

7. The process as recited in claim 1 wherein one or both of said copolymerization catalyst and said oligomerization catalyst are supported on support particles.

8. The process as recited in claim 7 wherein said copolymerization catalyst and said oligomerization catalyst are both supported on the same support particles.

9. The process as recited in claim 1 wherein said process is continuous.

10. The process as recited in claim 8 wherein said process is a gas phase, slurry, or solution process.

11. The process as recited in claim 4 wherein R$^1$, R$^2$, and R$^3$ are hydrogen and wherein R$^6$ is

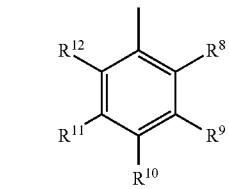

and wherein R$^7$ is

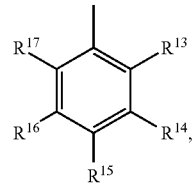

and wherein two of R$^4$, R$^5$, R$^8$, R$^{12}$, R$^{13}$ and R$^{17}$ are independently methyl or ethyl and the remainder of R$^4$, R$^5$, R$^8$, R$^{12}$, R$^{13}$ and R$^{17}$ are hydrogen and wherein R$^9$, R$^{10}$, R$^{11}$, R$^{14}$, R$^{15}$, and R$^{16}$ are each independently hydrogen, a functional group, hydrocarbyl, or substituted hydrocarbyl.

12. The process as recited in claim 1 wherein a catalyst that homopolymerizes ethylene but does not readily copolymerize ethylene and α-olefins is also present.

13. The process as recited in claim 2 wherein said oligomerization catalyst is an iron complex of a ligand of the formula:

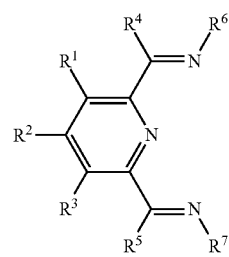

(I)

wherein:
R$^1$, R$^2$, and R$^3$ are each independently hydrogen, hydrocarbyl, substituted hydrocarbyl or an inert functional group, provided that any two of R$^1$, R$^2$, and R$^3$ vicinal to one another taken together optionally form a ring;
R$^4$ and R$^5$ are each independently hydrogen, hydrocarbyl, substituted hydrocarbyl, or an inert functional group provided that R$^1$ and R$^4$ and/or R$^3$ and R$^5$ taken together may form a ring; and
R$^6$ and R$^7$ are each independently aryl or substituted aryl.

* * * * *